United States Patent Office 3,544,120
Patented Dec. 1, 1970

3,544,120
FRICTION WELDING APPARATUS HAVING IMPROVED HYDROSTATIC BEARING ARRANGEMENT
Alex F. Stamm, Rochester, Mich., assignor, by mesne assignments, to Rockwell-Standard Company, Pittsburgh, Pa., a corporation of Delaware
Filed Oct. 23, 1968, Ser. No. 769,892
Int. Cl. B23b *31/30*
U.S. Cl. 279—4          13 Claims

ABSTRACT OF THE DISCLOSURE

A friction welding apparatus includes an arbor assembly surrounded by a housing, the arbor assembly having a generally cylindrical portion and a pressure actuated chucking means. The housing and the cylindrical portion of the arbor assembly cooperate to define a plurality of equally angularly spaced-apart journal bearing cavities for receiving hydraulic fluid under pressure to hydrostatically support the arbor assembly, and the arbor assembly further includes passages interconnecting the chucking means and a plurality of equally angular spaced-apart inlets on the cylindrical portion for supplying hydraulic fluid to the chucking means from the cavities. The inlets are each positioned to communicate sequentially with each, but not more than one at a time, of the cavities as the arbor assembly is rotated within the housing, the number of the cavities exceeding the number of inlets by an amount sufficient to assure at all times during rotation of the arbor assembly that the arbor assembly is hydrostatically supported in a balanced manner.

RELATED APPLICATION

This invention relates to and is an improvement over the hydrostatic bearing arrangement disclosed and claimed in copending patent application Ser. No. 650,505, entitled "Friction Welding Apparatus," filed on June 30, 1967, in the name of the inventor of this invention and assigned to the assignee of this invention.

BACKGROUND OF THE INVENTION

Field of the invention

This invention relates to hydrostatic bearing arrangements and pressure actuated chucking means for friction welding machines and, more particularly, to an improved arrangement in which the chucking means is pressurized directly from the hydrostatic journal bearing without adversely affecting the bearing operation and effectiveness. The invention also relates to an improved arrangement for preventing excessive flow of hydraulic fluid and for reducing substantially the number of small clearances between the rotating and non-rotating portions of the friction welding apparatus.

Description of the prior art

To friction weld together large components such as heavy steel drive axle components for large vhicles, it is necessary to apply very large axial thrust loads to the relatively rotating components. While only axial forces are deliberately applied to the components, very large radial forces are generated between the rubbing components due to localized stick welds and other non-uniform conditions existing during the welding process. Large capacity thrust and journal bearings are thus required to resist these applied and generated forces in order to provide satisfactory welding operation. Conventional bearing arrangements, including mechanical ball and roller assemblies, would have to be extremely complex, large, heavy and expensive in order to resist loads of the type encountered during friction welding of large components. The friction welding apparatus disclosed and claimed by the above-identified copending patent application includes large capacity hydrostatic journal and thrust bearings for satisfactorily resisting the large forces present during the welding operation, the hydrostatic bearings largely overcoming the deficiencies of conventional bearing arrangements. In the arrangement of the copending patent application, hydraulic fluid is utilized not only for pressurizing hydrostatic bearing pads, but also for pressurizing a unique chucking arrangement for holding the rotating workpiece in a fixed position relative to a supporting arbor assembly. To prevent excessive flow of hydraulic fluid through the system, the arrangement disclosed by the copending application requires small metal-to-metal clearances, other than hydrostatic bearing clearances, between the rotating and non-rotating components for metering the flow of hydraulic flow to the chucking arrangement. This approach requires critical sizing of the relatively rotating parts since excessive space between the parts can result in excessive flow of hydraulic fluid and insufficient space can result in undesired rubbing of the parts.

The arrangement of the copending application also utilizes a hydrostatic thrust bearing arrangement for opposing thrust forces present when welding is not being accomplished, this reverse thrust bearing arrangement including a continuous annular cavity filled with pressurized fluid. In accordance with well-known principles, small circumferentially extending axial clearances are provided radially inwardly and outwardly of the annular cavity for regulating the pressure of the hydraulic fluid within the cavity. Again, proper sizing and proportioning of the parts is extremely critical since excessive relative tilting of the parts can result in excessive axial clearance at a given circumferential point, the possible result being loss of pressure in the entire annular cavity and undesired rubbing of the diametrically opposite point.

SUMMARY OF THE INVENTION

It is therefore an object of this invention to provide an improved hydrostatic bearing arrangement for friction welding apparatus.

Another object of this invention is to provide for friction welding apparatus an improved hydrostatic bearing arrangement and chucking arrangement capable of preventing excessive flow of hydraulic fluid.

Still another object is to provide for friction welding apparatus a hydrostatic bearing arrangement in which undesired rubbing between rotating and non-rotating parts is substantially prevented.

Yet another object is to provide for friction welding apparatus a hydrostatic bearing arrangement and a pressure actuated chucking arrangement in which both excessive fluid leakage and undesired rubbing are substantially eliminated.

A still further object is to provide the foregoing objects without requiring the maintenance of extremely close manufacturing tolerances.

Briefly stated, in carrying out the invention in one form, a friction welding apparatus includes an arbor assembly surrounded by a housing, the arbor assembly having a generally cylindrical portion and a pressure actuated chucking means. The housing and the cylindrical portion of the arbor assembly cooperate to define a plurality of equally angularly spaced-apart journal bearing cavities for receiving hydraulic fluid under pressure to support the arbor assembly, and the arbor assembly further includes passages interconnecting the chucking means and a plurality of equally angularly spaced-apart inlets on the cylindrical portion for supplying hydraulic fluid to the chucking means from the cavities. The inlets are each positioned to communicate sequentially with each, but not more than one at a time, of the cavities as the arbor assembly is rotated within the housing, the number of the cavities exceeding the number of inlets by an amount sufficient to assure at all times during rotation of the arbor assembly that the arbor assembly is hydrostatically supported in a balanced manner.

By a further aspect of the invention, the cavities are supplied with hydraulic fluid from a common source by a plurality of metering orifices each communicating only with a single cavity. In this manner, the amount of fluid supplied to the chucking means as well as the cavities is controlled without reliance on small metering clearances between relatively rotating parts. By a still further aspect of the invention, the reverse thrust bearing includes a plurality of arcuate cavities supplied with hydraulic fluid from the common source by a plurality of metering orifices each communicating only with a single one of the arcuate cavities. In this manner, excessive clearance between the relatively rotating parts adjacent one of the arcuate cavities will not result in loss of bearing pressure and excessive flow of hydraulic fluid.

DESCRIPTION OF THE DRAWINGS

While this specification concludes with claims particularly pointing out and distinctly claiming the subject matter forming the invention, the invention, together with further objects and advantages may best be understood by reference to the following description taken in conjunction with the accompanying drawings, in which:

DETAILED DESCRIPTION

Figure 1:
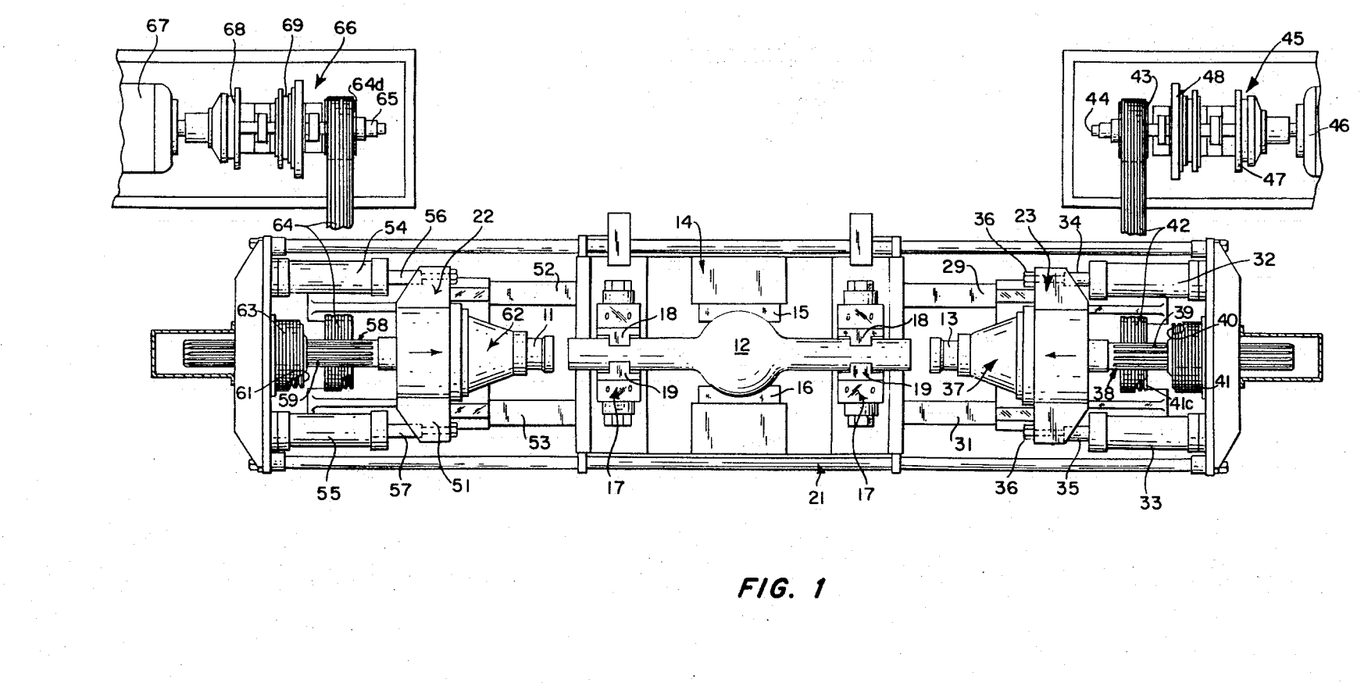
FIG. 1 is a top plan view illustrating the arrangement of parts in apparatus incorporating the invention.

FIG. 1 illustrates a friction welding apparatus wherein three workpieces 11, 12 and 13 are adapted to be friction welded together. In this arrangement the central workpiece 12, which may be an axle housing center section, is held stationary during the welding process and the other two workpieces 11 and 13, which may be wheel bearing end spindles, are rotated while being forced axially into contact with opposite ends of workpiece 12.

The central workpiece 12 is mounted in a cradle structure 14 and fixtures 17 wherein opposite sides are engaged and held by adjustable jaws 15, 16, 18 and 19. This arrangement supports and anchors the workpiece 12 relative to a machine base 21 against rotation or axial displacement during welding.

Workpiece 11 is mounted upon a hydrostatic bearing unit carrier 22 at one end of the base 21, and workpiece 13 is mounted upon a similar hydrostatic bearing unit carrier 23 at the opposite end of the base 21. These carriers 22 and 23 and the bearing units on them are essentially the same.

Figure 2:
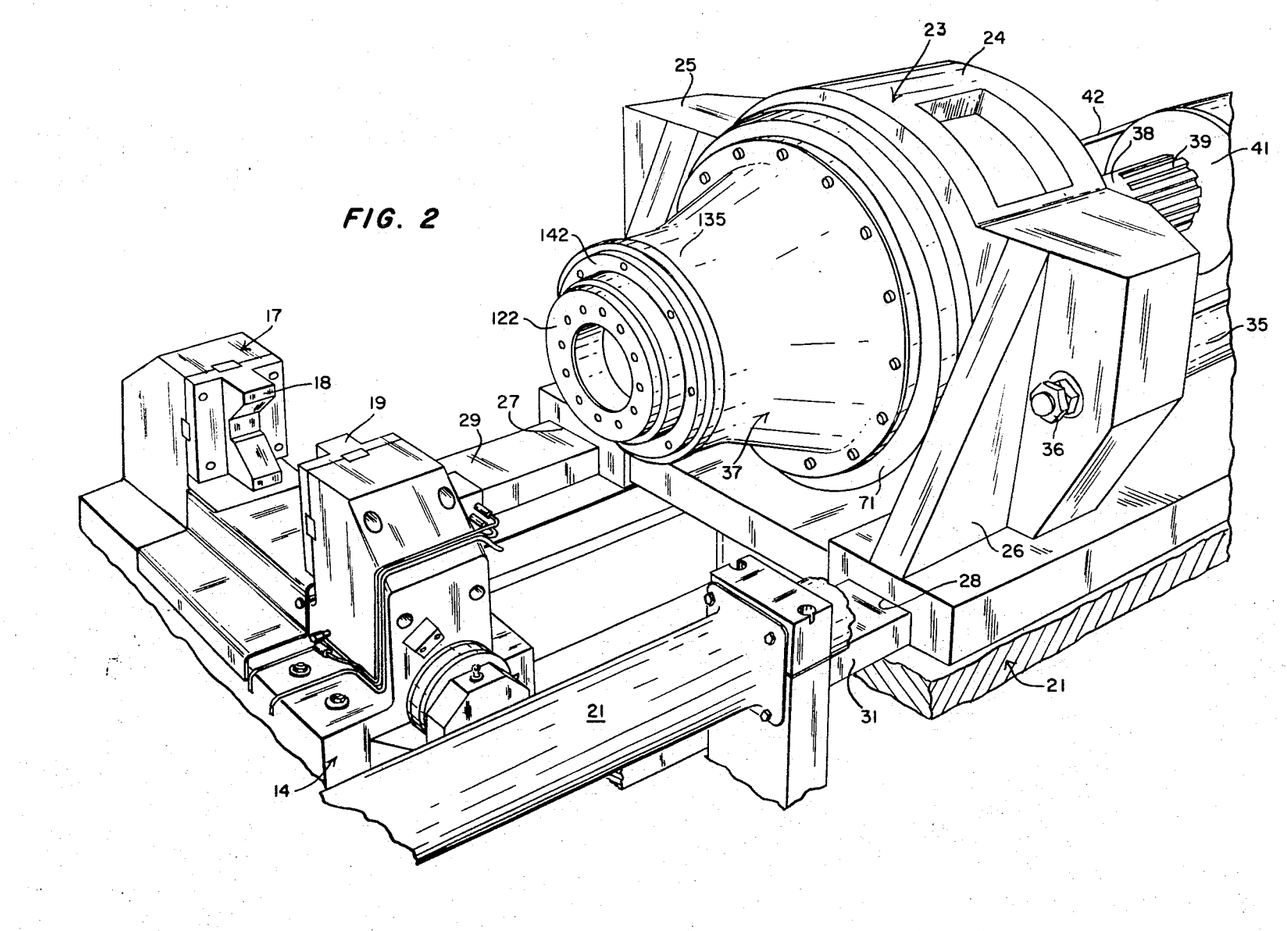
FIG. 2 is a generally perspective view showing one of the hydrostatic bearing units of the apparatus of FIG. 1.

FIG. 2 shows carrier 23 as comprising a frame 24 having rigid side members 25 and 26 formed at their lower ends with parallel rectangular guideway grooves 27 and 28 respectively slidably fitting with parallel rails 29 and 31 on the machine base 21.

Referring now to FIGS. 1 and 2, a pair of power cylinders 32 and 33 are fixed on base 21 with their piston rods 34 and 35, respectively, projecting parallel and at the same level into rigid connection with carrier frame 24. Fasteners such as nuts 36 assure that piston rods 34 and 35 are unitarily secured to frame 24. As will appear, introduction of fluid under pressure into both cylinders 32 and 33 will advance the carrier and the bearing unit cartridge 37 thereon toward the stationary workpiece 12.

A shaft 38, located centrally of carrier 23 and midway between cylinders 32 and 33, has a splined section 39 which axially slidably, but non-rotatably, extends through the hub of an axially stationary pulley 40 connected by belts 41 and 42 to a pulley 43 on the output shaft 44 of a power assembly 45 consisting essentially of an electric motor 46 connected to shaft 44 through a clutch unit at 47 and having a braking unit associated therewith at 48.

Shaft 38 enters the hydrostatic bearing unit cartridge 37 wherein, as will appears, it may be operably drive connected to the inserted workpiece 13. By confining pulley 40 against axial displacement and by providing the splined drive connection between pulley 40 and shaft 38, continuous rotation of shaft 38 need not be interrupted as the carrier 23 is axially displaced along guide rails 29 and 31.

Housing carrier 22, like carrier 23, is slidably mounted on machine frame guide rails 52 and 53, which are in parallel alignment with rails 29 and 31, and displacement of carrier 22 is controlled by parallel cylinders 54 and 55 connected by piston rods 56 and 57, respectively, to the carrier housing 51. A shaft 58 having a splined section 59 axially slidably extending through a pulley 61 extends into the bearing unit cartridge 62 to be connected, as will appear to rotate workpiece 11.

Pulley 61, which is rotatably mounted and confined against axial displacement is drivingly connected by belts 63 and 64 to an output shaft 65 of an independent power unit 66 that comprises an electric motor 67 connected to shaft 65 through a clutch 68 and having a braking unit associated therewith at 69.

The cartridges 37 and 62 are preferably exactly alike. With this in mind, the bearing unit carrier 22 and the cartridge 62 will be described with reference to FIG. 3. It will be understood, however, that the description of the carrier 22 and the cartridge 62 is equally applicable to the carrier 23 and the cartridge 37.

Figure 3:
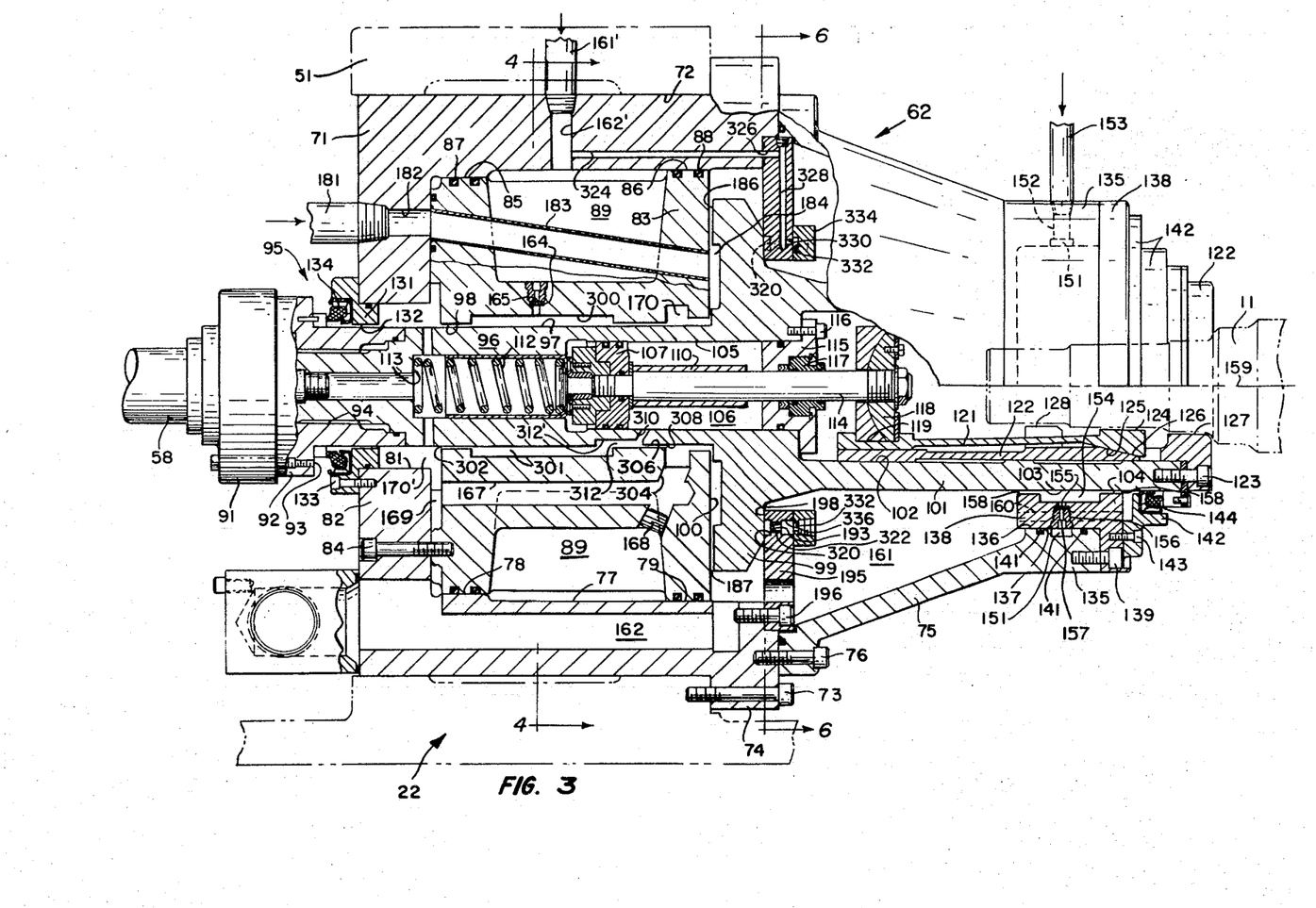
FIG. 3 is an elevation partly broken away and in section showing structural details of the hydrostatic bearing unit of FIG. 2.

Turning attention now to FIG. 3, the bearing unit cartridge 62 includes a housing 71 that has a cylindrical periphery fitted snugly within the inner periphery 72 of frame 51 of the bearing unit carrier 22. A series of machine screws 73 extend through a radial housing flange 74 to fix housing 71 to frame 51. A forwardly extending hollow conical nose portion 75 of the housing is secured to the housing 71 by a row of screws 76 at flange 74.

Housing 71 is formed with a forwardly open relatively large diameter recess 77, and recess 77 is provided with axially spaced concentric cylindrical surfaces 78 and 79, surface 78 near the bottom of the recess being of slightly smaller diameter. Concentric with recess 77 is a smaller diameter bore 81 through rear wall 82 of the housing.

Within recess 77, a housing core section 83 is secured by a series of machine screws 84 extending through wall 82. Core 83 is formed with cylindrical end surfaces 85 and 86 fitting snugly with recess surfaces 78 and 79, respectively, and resilient seal ring and groove arrangements indicated at 87 and 88 respectively provide static seals, whereby interiorly of the housing 71 an annular chamber 89 is defined between core 83 and the surrounding housing portion.

As will appear, core 83 is formed with special fluid distribution passages. It is preferably made as a physically separate part from the housing to permit the forming therein of such passages without unduly complex casting or machining operations, but once in place as shown in FIG. 3 it becomes essentially a unitary part of housing 71.

Power driven shaft 58 is connected to a coupling 91 which is secured to the end of a drive sleeve 92 by bolts 93. Sleeve 92 is non-rotatably mounted, as by splines at 94, on the end of a hollow arbor assembly 95. Arbor assembly 95 comprises a rear section 96 having a cylindrical surface 97 passing through a surrounding cylindrical bore 98 in core 83, a radially enlarged flange section 99 adjacent a flat front core face 100 which is perpendicular to the arbor axis, and a forward section 101 having an internal cylindrical bore 102 and an outer cylindrical periphery 103 surrounded by a cylindrical bore 104 on the front end of the housing nose 75.

As will appear, the arbor assembly is radially supported within the housing on hydrostatic journal bearing means effective between arbor section 96 and bore 98 and between arbor section 101 and bore 104.

Arbor section 96 is enlarged internally at 105 to form a cylinder chamber 106 within which a piston 107 is slidably mounted. A compression spring 112 reacts between a radial wall 113 within the arbor and piston 107 to urge the piston to the right, the piston 107 being illustrated in FIG. 3 in its rearmost position with the spring 112 fully compressed.

A piston rod 114 fixed to piston 107 extends slidably through a cap 115 secured as by screws 116 to the flange section of the arbor to otherwise close the forward end of chamber 106. A suitable sealed bearing assembly indicated at 117 permits free sliding of rod 114 while maintaining fluid pressure in chamber 106. A spacer sleeve 110 on rod 114 limits forward displacement of piston 107, the forward position of the piston occurring when the sleeve 110 contacts the cap 115.

At its forward end, piston rod 114 is secured to a swivel coupling 118 peripherally engaged in internal annular grooves 119 on the rear end of a series of chuck elements 121, which in turn are axially slidably mounted on a chuck element 122 fixed by screws 123 to the forward end of the section 101 of the arbor assembly 95. There are usually several chuck elements 121 equally circumferentially distributed about the workpiece.

The forward end of each chuck element 121 has an inner workpiece engaging surface 124 and an external generally conical contour surface 125 that slidably engages an inclined conical surface 126 on fixed clutch element 122. Fixed clutch element 122 has an internal annular workpiece engaging surface at 127, and a series of circumferentially spaced internal workpiece engaging surfaces 128 between which extend the movable chuck elements 121.

The chuck arrangement and structure shown in FIG. 3 is for holding axle spindles of the shape illustrated. The invention contemplates any equivalent chuck arrangement suited to the workpieces being welded.

In FIG. 3, piston 107 is shown displaced to its rearmost position by fluid pressure in chamber 106, and in that position it has displaced chuck elements 121 to the left whereby they ride up cam surfaces 126 to contract the chuck and peripherally grip workpiece 11 to lock it nonrotatably to the arbor assembly 95 concentrically on the axis of rotation of the arbor assembly. This condition exists during the friction welding operation as will appear.

The rear end of housing bore 81 contains a ring 131, the internal periphery 132 of which has free running clearance with the arbor. Ring 131 is secured to the housing as by screws 133 and mounts an annular axially resilient seal assembly 134 axially disposed between the stationary housing and the rotating arbor assembly. Thus, fluid is sealed against escape axially through housing bore 81.

At the front end of the cartridge, housing member 75 terminates in boss 135 having a cylindrical bore 136 snugly receiving the cylindrical surface 137 of a bearing collar 138 secured to the housing as by scsews 139. Bore 104 is formed on the inner periphery of collar 138. Static seal rings 141 are provided between bore 136 and surface 137.

At its forward end a ring 142 secured to collar 138 as by screws 143 mounts an axially resilient seal assembly 144 axially disposed between the stationary housing structure and the rotating arbor assembly. Thus, fluid is sealed against escape through the front end of the housing.

Seals 134 and 144 are the only two seals needed between the arbor assembly and the housing.

The friction welding apparatus just described is substantially identical to that disclosed in the aforesaid copending patent application, the novel and invention subject matter of this invention residing in the improved hydrostatic bearing arrangement, which will now be described.

Figures 4, 5:
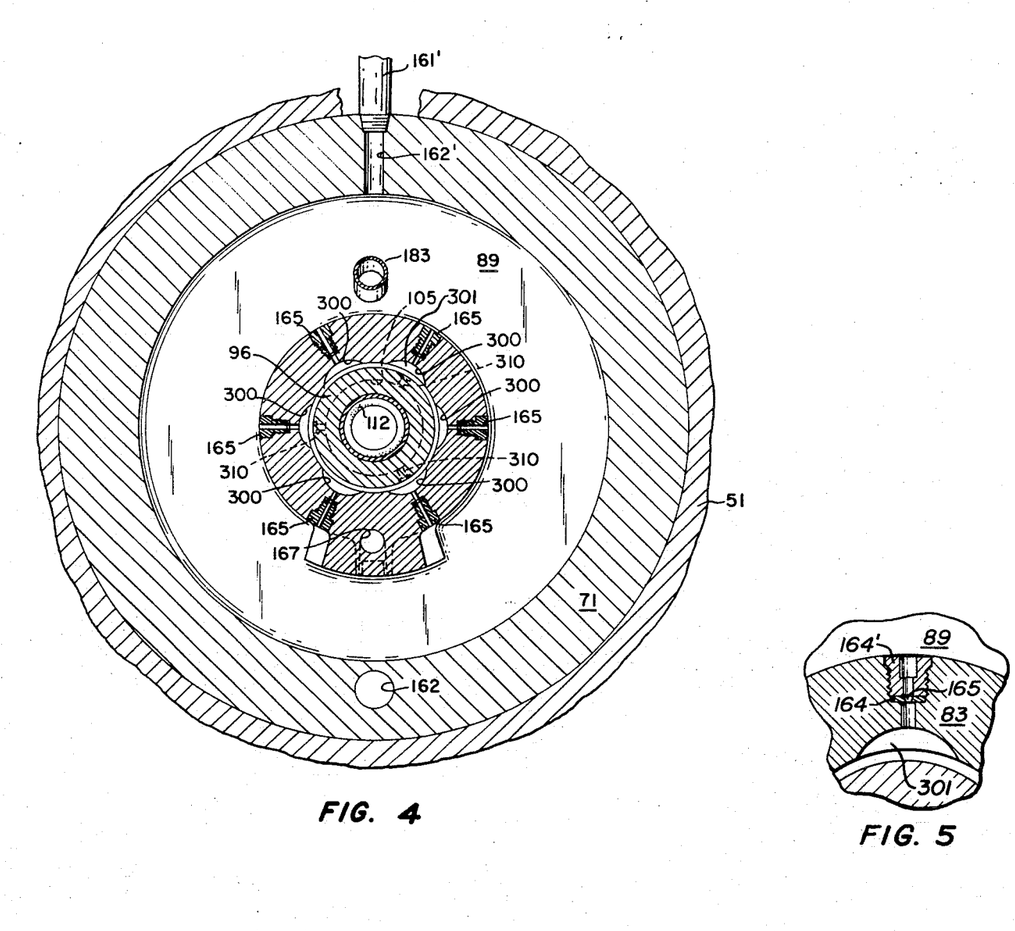
FIG. 4 is a sectional view substantially along line 4—4 of FIG. 3.
FIG. 5 is an enlarged fragmentary view of one of the journal bearing oil supply orifice structures of FIG. 4.

Turning attention now to FIGS. 3 and 4, the hydrostatic journal bearing formed between the core 83 and the arbor assembly 95 will be described. As illustrated, six recesses 300 are formed in the inner cylindrical surface 98 of the core 83 such that the core 83 and the cylindrical surface 97 of the arbor portion 96 cooperate to define therebetween six cavities 301 which act as hydrostatic bearing pads for rotatably supporting the arbor assembly 95 and the workpiece 11. The cavities 301 are equally angularly spaced about the rotational axis of the arbor assembly 95, each having substantial axial extent as illustrated by FIG. 3. At the opposite axial ends of the cavities 301, the cylindrical surfaces 98 and 97 cooperate to define circumferential passages 302 and 308 of limited radial clearance, the clearance of these passages 302 and 308 being approximately 0.002 to 0.003 inch when the arbor assembly 95 is precisely centered within the core 83. Similarly, as shown by FIG. 4, the surfaces 98 and 97 define axial passages 306 of similar limited radial clearance between adjacent ones of the cavities 301.

Still referring to FIGS. 3 and 4, the portion 96 of the arbor assembly 95 has three passages 310 therein interconnecting the cylinder chamber 106 of the chucking means and inlets 312 provided on the surface 97. The passages 310 are equally angularly spaced apart, the openings between the passages 310 and the chamber 106 being axially located such that they are not closed by the piston 107 when the piston is in its forward position with the sleeve 110 contacting the cap 115. The inlets 312 include axially extending flats 312' machined into the cylindrical surface 97 for permitting flow of fluid between the cavities 301 and the chamber 106 through the passages 310 when the flats 312' are angularly aligned with three respective ones of the cavities 301. The flats 312' have angular extents less than the angular extents of the axial passages 306 between adjacent cavities 301 so that each passage 310 can never connect more than one cavity 301 to the chamber 106. Since there are six equally spaced cavities 301 and three equally spaced passages 310, it will be clear that at least three equally angularly spaced-apart cavities 301 are isolated from the chamber 106 at all times, and that it is possible at certain angular relationships between the core 83 and the arbor assembly 95 that all six cavities 301 are isolated from the chamber 106. In the latter case, the inlets 312 would, of course, be angularly aligned with the passages 306 rather than with the cavities 301.

To summarize briefly, the passages 310 and their inlets 312 are positioned such that rotation of the arbor assembly 95 within the housing 71, including the core 83, will result in each inlet 312 being sequentially aligned with each of the cavities 301. At no time, however, is any inlet 312 aligned with more than one cavity.

As will become more apparent as this description proceeds, hydraulic fluid under pressure is supplied to the chamber 89 by means of a supply conduit 161' and a housing passage 162' when it is desired to friction weld the workpiece 11 to the workpiece 12. From the chamber 89, which serves as a manifold, the hydraulic fluid is metered to the cavities 301 by six accurately sized, sharp edged orifices 165, each communicating with a single one of the recesses 300. As best illustrated by FIG. 5, each orifice 165 is formed by an orifice disk 164 held in place in the core 83 by a fitting 164'. The manner in which the hydraulic fluid supplied through the orifices 165 to the cavities 301 is utilized to both rotatably support the portion 96 of the arbor assembly 95 and to cause the workpiece engaging surfaces 124 of the chuck elements 121 to non-rotatably grasp the workpiece 11 will soon become apparent.

Referring now to FIG. 3, the circumferential passages 302 and 308 communicate with a passage 162 through which hydraulic fluid discharged from the cavities 301 can flow back to a sump, from which the fluid can be recycled. More particularly, the passage 308 communicates with an annular recess 170, which is connected to the passage 162 by an axial passage 167 in the core 83 and a radial passage 169 between the core 83 and the rear wall 82 of the housing 71. The passage 302 communicates with an annular recess 170', which in turn communicates with the passage 162 through the radial passage 169. Communication between the passage 167 and the chamber 89 is blocked by a plug 168.

An oil supply conduit 181 is connected by a passage 182 to one end of a conduit 183 extending longitudinally of core 83 to open into a relatively shallow annular cavity 184 defined by an annular recess 185 in the rear face of arbor flange 99 and the flat front face 100 of the core 83, which is secured to and is thus functionally a part of the housing 71. Radially outwardly of annular cavity 184, the arbor flange 99 is formed with an annular flat face 186 that is adjacent and parallel to core face 100 so as to define a variable clearance annular passage gap indicated at 187 through which hydraulic fluid from cavity 184 can flow to the lower pressure sump return passage 162. Radially inwardly of the annular cavity 184, the arbor flange 99 is formed with an annular flat face 186' that is adjacent and parallel to core face 100 so as to define a variable clearance annular pasage gap indicated at 187' through which hydraulic fluid from the cavity 184 can flow to the lower pressure sump return passage 162 through the annular recess 170, the passage 167, and the passage 169. This arrangement comprises the main hydrostatic thrust bearing, and its operation will soon become clear.

Figures 6, 7:
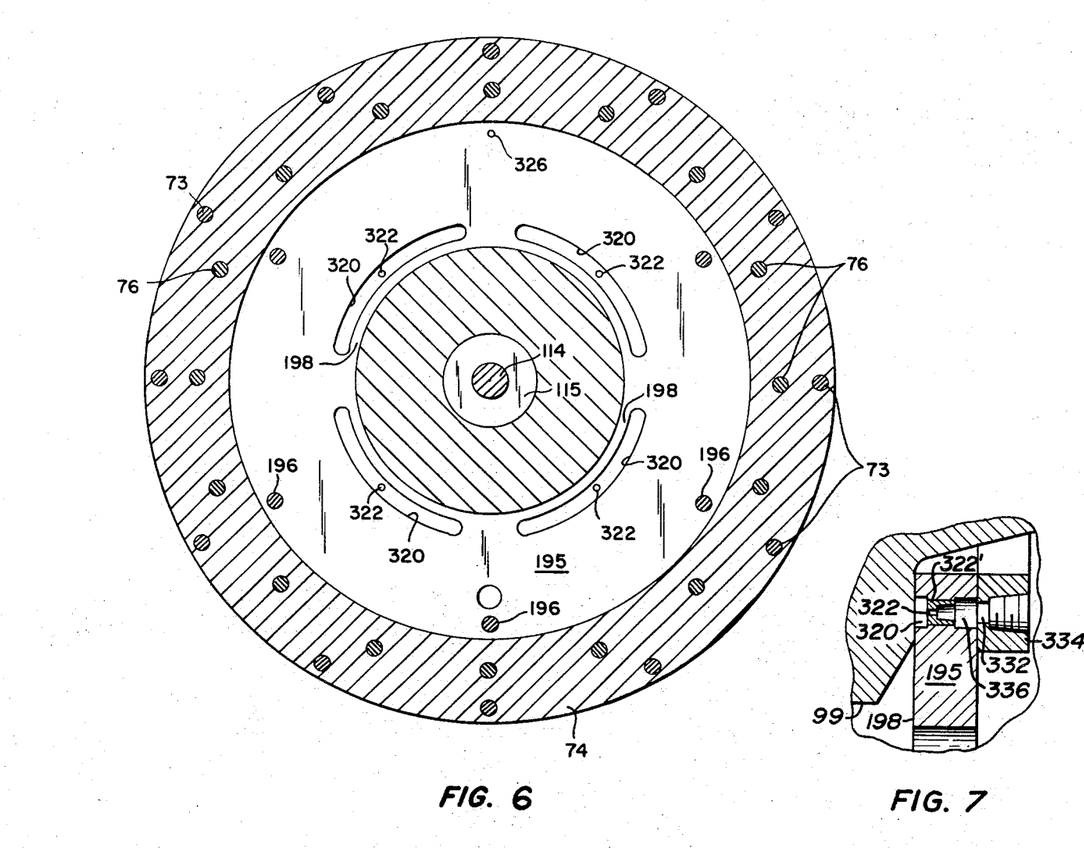
FIG. 6 is a sectional view substantially along line 6—6 of FIG. 3.
FIG. 7 is an enlarged fragmentary view of one of the thrust bearing oil supply orifice structures illustrated by FIG. 3 for supplying hydraulic fluid to the cavities of FIG. 6.

Referring to FIGS. 3, 6 and 7, four circumferentially spaced-apart arcuate grooves 320 are formed in a block 195, which is secured to the housing 71 by bolts 196 so as to form an integral portion of the complete housing. Grooves 320 extend along a common radius, and each groove is supplied with oil under pressure through an orifice 322 formed by an orifice plate 322'. Grooves 320 have equal lengths and are spaced apart by equal angles to provide a balanced, symmetrical arrangement.

As shown, hydraulic fluid under pressure in passage 162', in addition to flowing into chamber 89, flows through a passage 324 into a passage 326. Passages 324 and 326 are aligned and are respectively formed in housing 71 and block 195. A second passage 328, formed in block 195 and intersecting passage 326, directs oil under pressure to a short axial passage 330 which is also formed in block 195. Passage 330 opens into an annular groove 332 which is formed in a rigid ring 334 fixed to block 195. Oil under pressure thus fills groove 332 and is distributed to four axial through bores 336 which are formed in block 195. Orifices 322 are mounted one in each of the bores 336 to meter the oil supplied to their associated thrust bearing grooves 320. This arrangement constitutes the secondary thrust bearing arrangement for preventing metal-to-metal contact between the flange 99 and the flat face 198 of block 195 when welding is not being accomplished.

To rotatably support the portion 101 of the arbor assembly 95, a hydrostatic journal bearing is provided between the portion 101 and bore 104 at the front end of the cartridge 62 as taught in the aforesaid copending patent application, the hydraulic fluid being supplied thereto through conduit 153. While this front bearing arrangement is essential for proper support of the arbor assembly 95, the present invention resides in the unique configuration of the rear journal and thrust bearing arrangements and the chucking arrangement. Before turning attention to the unique features of the present invention however, attention is directed to FIG. 8 for a description of a suitable fluid supply system for the friction welding apparatus.

Figure 8:
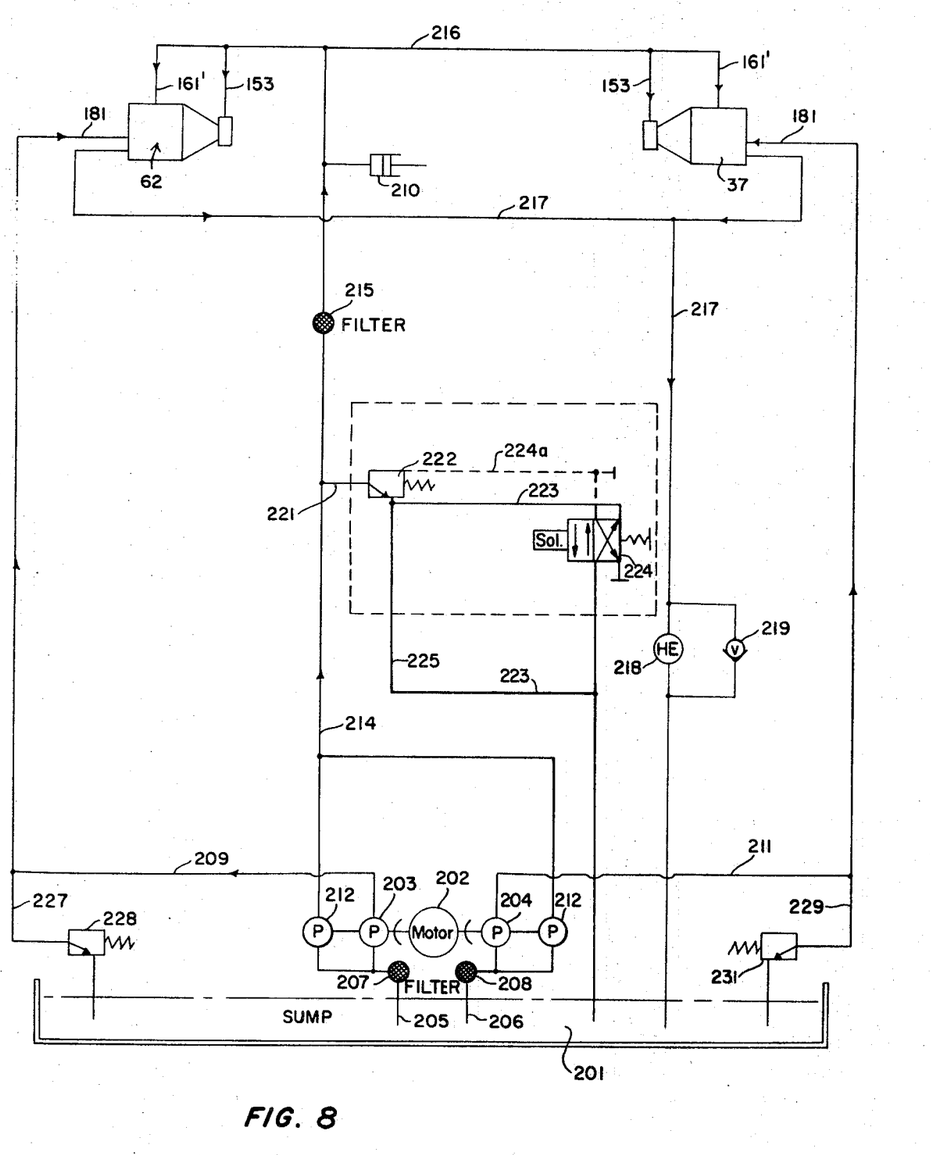
FIG. 8 is a diagrammatic view showing the circuit arrangements for explanation of operation under the invention.

Referring to FIG. 8, the oil sump is indicated at 201. an electric motor 202 drives two similar constant or fixed displacement pumps 203 and 204 to withdraw hydraulic fluid through conduits 205 and 206 and filters 207 and 208 respectively. Pumps of this type, as is well known, provide a constant rate of flow.

Pump 203 delivers hydraulic fluid such as oil to conduit 209 that is connected to conduit 181. Conduit 181, as shown in FIG. 3, leads into hydrostatic bearing and cartridge 62 for supplying oil to the main hydrostatic thrust bearing there. Similarly, pump 204 delivers oil to conduit 211 connected to the conduit 181 leading into hydrostatic bearing cartridge 37 for supplying oil to the main hydrostatic thrust bearing there.

A separate fixed displacement dual pump 212 driven by motor 202 supplies oil to all of the hydrostatic journal bearings and the secondary thrust bearing. Outlet conduit 214 from pump 212 delivers oil through a filter 215 to a line 216 that connects to both conduits 153 and 161' of both hydrostatic bearing cartridges. Conduit 214 is also connected to a pressure switch 210 which is disposed in the main control circuit for the welding apparatus, and this switch will be open whenever the pressure in line 214 drops slightly below the designed operating pressure. When oil comes up to operating pressure, switch 210 is actuated to allow the actual welding cycle to be started. Cartridges 37 and 62 have a common drain line 217 connected to passages 162 for returning oil back to the sump 201 after passing through the thrust and journal bearings.

With pump 212 supplying a fixed quantity of hydraulic fluid, a relief valve 222 is provided for maintaining the pressure at the line 216, and hence at the journal and secondary thrust bearings, at a fixed level during a required portion of the welding cycle.

Referring now to FIGS. 1–3 for a description of the operation of the friction welding apparatus, the workpiece 12 is initially clamped into position by jaws 15, 16, 18 and 19. The workpieces 11 and 13 are inserted into the open ends of the hydrostatic bearing cartridges, pistons 107 at this time being displaced into the forward positions as to the right in FIG. 3 by springs 112 so that chuck elements 121 have been forwardly displaced to loosely axially receive the workpieces. At this time, the end faces of the workpieces to be friction welded together are axially aligned.

At this point, the control systems for the welding machine is energized. A suitable control system is disclosed and claimed in detail in my copending application Ser. No. 650,396 for "Method and Apparatus for Friction Welding," filed June 30, 1967 and assigned to the assignee of this invention. It is believed that no detailed reference to it is necessary except to point out that the motor 202 of FIG. 8 runs continuously during and between welding cycles and is thus operating when the motors 46 and 67 of FIG. 1 are started and drive connected to the spindles 11 and 13 to rotate the spindles.

Before the workpieces 11 and 13 are rotated, however, they must be securely held by the chuck elements 121, and the arbor assemblies 95 must be supported in a suitable manner for rotation. To accomplish both of these functions, hydraulic fluid under a fixed pressure of about 1500 p.s.i. as controlled by the valve 222 is supplied to the rear and front hydrostatic bearings and the secondary thrust bearing.

Turning attention now to the rear hydrostatic bearing, the high pressure fluid in the annular chamber, or manifold, 89 flows through the orifices 165 and to the six cavities 301. Since in most relative positions of the housing and arbor assembly three of the cavities 301 will be connected to the chamber 106 by the passages 310, pressurized fluid will be supplied to the chamber 106 where it will exert a force on the piston 107 sufficient to overcome the biasing force of the spring 112 and move the piston 107 to the position illustrated by FIG. 3. As a result, the workpieces 11 and 13 will be secured by the chuck elements 121.

Since the three cavities 301 connected to the chamber 106 by the passages 310 are thus effectively interconnected to each other, there can be no significant pressure difference between these cavities. As a result, these cavities do not contribute to the hydrostatic support function. However, the other three cavities 301 are not interconnected by the passages 310 and, consequently, substantial pressure differences can exist therebetween since the flow areas of the orifices 165 and the radial passages 302, 308 and 306 are quite small. It is these three cavities that provide the radial support. Let is be assumed that a radial force, such as might be generated during the welding process, is applied downwardly on the arbor portion 96 as viewed in FIG. 3. This would tend to increase the flow areas of the passages 302, 308 and 306 adjacent the upper cavities 301 and reduce the flow areas adjacent the lower cavities. As a result, the pressure would tend to fall in the upper cavities (not interconnected by the chamber 106) and rise in the lower cavities. The result would be an upward net pressure force applied to the arbor section 96 tending to return it to its equilibrium position.

Once rotation of the arbor assembly 95 has been started (through closing of the pressure switch 210) the inlets 312 will sequently communicate with each of the cavities 301 so that each cavity 301 is alternately vented to the chamber 106 by the passages 310 and utilized as a bearing pad. The result is that the workpieces 11 and 13 are continually held by the chuck members 121 and the arbor portion 96 is continuously supported against metal-to-metal contact. It will occur to those skilled in the are that it would be conceivable to utilize more than six spaced-apart cavities 301, and that more or less than three passages 310 may be utilized to communicate to the chamber 106. Any arrangement selected, however, should provide at all times a hydraulic support arrangement for the arbor. Thus, with six cavities, two diametrically opposed cavities could be connected to the chamber 106 since the remaining four cavities would provide angularly balanced support capability. In any event, the maximum angular displacement at any time between two adjacent hydrostatic supports should be less than 180°.

It should be noted that the fluid used for hydrostatically supporting the arbor portion 96 and actuating the chuck elements 121 is metered by the orifices 165 and the small clearance gaps 302 and 308. As a result, there is no excess flow of fluid and no undesired metal-to-metal contact between surfaces used for metering, but not hydrostatic support, purposes.

Operation of the main and secondary thrust bearing assemblies will now be described with reference to FIGS. 3, 6, 7 and 8. The flange section 99 of the arbor assembly 95 can move axially between the flat radial faces 100 and 198 during operation. More particularly, when welding is not being accomplished, the constant flow of hydraulic fluid supplied through conduit 181 to the annular cavity 184 of the main thrust bearing will force the flange section 99 to the right as viewed in FIG. 3, opening the flow areas of the passages 187 and 187' and reducing the pressure within the cavity 184 to approximately 50 p.s.i. While this will naturally decrease the flow areas of the radial passages of the secondary thrust bearing, the high pressure supplied thereto through conduit 161' will assure that equilibrium will be attained prior to the occurrence of metal-to-metal contact therebetween. Furthermore, in the event that the flange 99 should tilt to any extent at this point, the distinct arcuate grooves 320 and orifices 322 will prevent metal-to-metal contact and properly reposition the flange section 99 since pressures will fall where clearances are increased and rise where clearances are decreased. The separate orifices will also prevent excessive loss of hydraulic fluid through large clearances due to tilting or, as will become obvious, due to large welding thrust loads.

When the workpieces 11, 12 and 13 are axially forced together, the flange section 99 will move toward the flat face 100 of the core 83 and thereby reduce the flow areas of passages 187 and 187'. Since the flow of hydraulic fluid to the annular cavity 184 is constant, the pressure will rise to a level at which the thrust load is balanced. As a practical manner, the pressure within the cavity can rise to as much as 2000 p.s.i., more than sufficient to within the largest thrust loads. Under these conditions, the metal-to-metal clearance of the passages 187 and 187' will be quite small and the clearances of the passages of the secondary thrust bearing will be correspondingly large. However, excessive flow of hydraulic fluid at the secondary thrust bearing will be prevented by the multiple orifices 322.

From the foregoing, it will be seen that this invention provides an improved hydrostatic bearing arrangement and a pressure actuated chucking arrangement in which both excessive fluid leakage and undesired rubbing between metal surfaces are substantially eliminated without the maintenance of extremely close manufacturing tolerances.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed as new and is desired to secure by Letters Patent is:

1. Apparatus for use in friction welding comprising:
   an arbor assembly having a generally cylindrical external portion and pressure actuated chucking means for gripping and holding a work piece for rotation with said arbor assembly,
   a housing surrounding said arbor assembly,
   said housing defining with said generally cylindrical portion of said arbor assembly a plurality of journal bearing cavities equally angularly spaced about said generally cylindrical portion for receiving hydraulic fluid under pressure to rotatably support said arbor assembly,
   and passage means in said arbor assembly interconnecting said chucking means and a plurality of equally angularly spaced apart inlets on said generally cylindrical portion for supplying hydraulic fluid from said cavities to said chucking means,
   each of said inlets being positioned axially to communicate sequentially with each of said cavities as said arbor assembly is rotated within said housing and being angularly sized to prevent simultaneous communication with more than one of said cavities,
   the number of said cavities exceeding the number of said inlets by an amount sufficient to assure at all times during rotation of said arbor assembly that at least three angularly balanced ones of said cavities are positioned out of communication with said inlets.

2. Apparatus for use in friction welding as defined by claim 1 in which:

said housing and said generally cylindrical portion cooperate to form therebetween circumferential passages of limited radial clearance at axially opposite ends of said cavities and axial passages of limited radial clearance between adjacent ones of said cavities, said limited clearance passages permitting controlled leakage of hydraulic fluid between and from said cavities to regulate the fluid pressure within said cavities so as to thereby prevent direct contact between said arbor assembly and said housing adjacent said cavities.

3. Apparatus for use in friction welding as defined by claim 2 in which said chucking means comprises:

a substantially closed cylinder within said arbor assembly, a piston reciprocably mounted within said cylinder for movement between first and second end positions, means responsive to the position of said piston for gripping the work piece when said piston is in said first end position and for releasing the work piece when said piston is in said second end position, means biasing said piston toward said second end position, said passage means in said arbor assembly interconnecting said inlets and said cylinder such that the pressure of hydraulic fluid supplied to said cylinder from said cavities overcomes said biasing means to move said piston to said first end position, whereby hydraulic fluid supplied to said cavities not only rotatably supports said arbor assembly but also causes said chucking means to grip the work piece to be welded.

4. Apparatus for use in friction welding as defined by claim 2 further comprising:

a sump, manifold means, pump means interconnecting said sump and said manifold means for supplying hydraulic fluid from said sump to said manifold means at high pressure, a plurality of orifice means each interconnecting said manifold means and a respective one only of said cavities for supplying hydraulic fluid under pressure to said cavities, and drain means including said passages at opposite axial ends of said cavities interconnecting said cavities and said sump for returning hydraulic fluid at low pressure to said sump.

5. Apparatus for use in friction welding as defined by claim 4 in which:

said arbor assembly further includes a radially projecting flange portion axially spaced from said generally cylindrical portion, said housing defining with said flange portion an annular thrust bearing cavity for receiving hydraulic fluid to resist thrust loads applied during welding of the work piece and annular passages of variable axial clearance at the radially inner and outer sides of said annular cavity for permitting controlled leakage of hydraulic fluid from said annular cavity to regulate the fluid pressure within said annular cavity so as to thereby prevent direct contact between said flange portion and said housing adjacent said annular cavity and resist thrust loads applied during welding, secondary pump means interconnecting said sump and said annular cavity for supplying a constant rate hydraulic fluid thereto, and said drain means further including said annular passages for returning hydraulic fluid at low pressure from said annular cavity to said sump.

6. Apparatus for use in friction welding as defined by claim 5 in which:

said annular cavity is on the side of said flange portion adjacent said generally cylindrical portion, and said drain means further including an annular recess between said arbor assembly and said housing axially intermediate said cavities and said annular cavity, said limited radial clearance circumferential passage adjacent said flange portion and said variable axial clearance annular passage at the radially inner side of said annular cavity directly communicating with said annular recess for supplying leakage fluid thereto for return to said sump.

7. Apparatus for use in friction welding as defined by claim 6 in which said chucking means comprises:

a substantially closed cylinder within said arbor assembly, a piston reciprocably mounted within said cylinder for movement between first and second end positions, means responsive to the position of said piston for gripping the work piece when said piston is in said first end position and for releasing the work piece when said piston is in said second end position, means biasing said piston toward said second end position, said passage means in said arbor assembly interconnecting said inlets and said cylinder such that the pressure of hydraulic fluid supplied to said cylinder from said cavities overcomes said biasing means to move said piston to said first end position, whereby hydraulic fluid supplied to said cavities not only rotatably supports said arbor assembly but also causes said chucking means to grip the work piece to be welded.

8. Apparatus for use in friction welding as defined by claim 4 in which:

said arbor assembly further includes a radially projecting flange portion axially spaced from said generally cylindrical portion, said housing defining with said flange portion a continuous annular thrust bearing cavity on one side of said flange portion and a plurality of arcuate thrust bearing cavities on the other side of said flange portion for receiving hydraulic fluid to resist thrust loads applied during operation of said apparatus, said housing and said flange portion further defining therebetween annular passages of variable axial clearance at the radial inner and outer sides of said annular cavity and said arcuate cavities and radial passages of variable axial clearance between said arcuate cavities for permitting controlled leakage of hydraulic fluid between said arcuate cavities and from said annular and arcuate cavities to regulate the fluid pressure within said annular and arcuate cavities so as to thereby prevent direct contact between said flange portion and said housing and resist thrust loads applied during operation, secondary manifold means, said pump means interconnecting said sump and said secondary manifold means for supplying hydraulic fluid from said sump to said secondary manifold means a high pressure, a second plurality of orifice means each interconnecting said secondary manifold means and a respective one only of said arcuate cavities for supplying hydraulic fluid under pressure to said cavities, secondary pump means interconnecting said sump and said annular cavity for supplying a constant rate hydraulic fluid thereto, and said drain means further including said annular passages at the radially inner and outer ends of said annular and arcuate cavities for returning hydraulic fluid at low pressure from said annular and arcuate passages to said sump.

9. Apparatus for use in friction welding as defined by claim 8 in which:
said annular cavity is on the side of said flange portion adjacent said generally cylindrical portion, and said drain means further including an annular recess between said arbor assembly and said housing axially intermediate said cavities and said annular cavity, said limited radial clearance circumferential passage adjacent said flange portion and said variable axial clearance annular passage at the radially inner side of said annular cavity directly communicating with said annular recess for supplying leakage fluid thereto for return to said sump.

10. Apparatus for use in friction welding as defined by claim 9 in which said chucking means comprises:
a substantially closed cylinder within said arbor assembly,
a piston reciprocably mounted within said cylinder for movement between first and second end positions,
means responsive to the position of said piston for gripping the work piece when said piston is in said first end position and for releasing the work piece when said piston is in said second end position,
means biasing said piston toward said second end position,
said passage means in said arbor assembly interconnecting said inlets and said cylinder such that the pressure of hydraulic fluid supplied to said cylinder from said cavities overcomes said biasing means to move said piston to said first end position, whereby hydraulic fluid supplied to said cavities not only rotatably supports said arbor assembly but also causes said chucking means to grip the work piece to be welded.

11. Apparatus for use in friction welding as defined by claim 10 in which the number of said cavities is twice the number of said inlets.

12. Apparatus for use in friction welding as defined by claim 10 in which said inlets include flats provided on the generally cylindrical portion of said arbor assembly, the angular extent of each of said flats being less than the angular extent of said axial passages between adjacent ones of said cavities.

13. Apparatus for use in friction welding as defined by claim 12 in which there are six of said cavities and three of said inlets.

References Cited

UNITED STATES PATENTS

| | | | |
|---|---|---|---|
| 3,177,745 | 4/1965 | Brown, Sr. | 82—40 |
| 3,202,432 | 8/1965 | Cameron | 279—4 |
| 3,380,641 | 4/1968 | Deemie et al. | 228—2 |
| 3,392,985 | 7/1968 | Swarbrick | 279—4 |
| 3,460,734 | 8/1969 | Vill et al. | 228—2 |
| 3,499,692 | 3/1970 | Kaiser | 308—9 |

JOHN F. CAMPBELL, Primary Examiner

R. J. CRAIG, Assistant Examiner

U.S. Cl. X.R.

29—470.3; 82—40; 308—9; 228—2